(12) United States Patent
Rajakarunanayake et al.

(10) Patent No.: US 9,202,070 B2
(45) Date of Patent: Dec. 1, 2015

(54) INPUT/OUTPUT GATEKEEPING

(71) Applicant: Broadcom Corporation, Irvine, CA (US)

(72) Inventors: Yasantha Rajakarunanayake, San Ramon, CA (US); William Bunch, Campbell, CA (US); Jacob Mendel, Kibutz Givat Brenner (IL)

(73) Assignee: BROADCOM CORPORATION, Irvine, CA (US)

( * ) Notice: Subject to any disclaimer, the term of this patent is extended or adjusted under 35 U.S.C. 154(b) by 22 days.

(21) Appl. No.: 13/708,269

(22) Filed: Dec. 7, 2012

(65) Prior Publication Data

US 2014/0123209 A1     May 1, 2014

Related U.S. Application Data

(60) Provisional application No. 61/720,584, filed on Oct. 31, 2012.

(51) Int. Cl.
*G06F 17/00* (2006.01)
*G06F 21/60* (2013.01)
*H04W 12/08* (2009.01)

(52) U.S. Cl.
CPC ............. *G06F 21/606* (2013.01); *H04W 12/08* (2013.01); *G06F 2221/2111* (2013.01)

(58) Field of Classification Search
CPC ... H04L 63/102; H04L 63/0227; H04L 63/10; H04W 12/08; H04W 72/005; H04W 48/02; H04W 52/0254; G06F 2221/2141; G06F 2221/2149; G06F 21/62; G06F 21/34; G07F 7/0886; G07F 7/0826
See application file for complete search history.

(56) References Cited

U.S. PATENT DOCUMENTS

| | | | |
|---|---|---|---|
| 7,716,489 B1* | 5/2010 | Brandt et al. | 713/180 |
| 8,255,687 B1* | 8/2012 | Pelly et al. | 713/164 |
| 8,756,689 B2* | 6/2014 | Jani et al. | 726/22 |
| 2007/0050362 A1* | 3/2007 | Low et al. | 707/8 |
| 2009/0265754 A1* | 10/2009 | Hinds | 726/1 |
| 2009/0313680 A1* | 12/2009 | Hirano | 726/3 |
| 2010/0093412 A1* | 4/2010 | Serra et al. | 455/575.8 |
| 2010/0319051 A1* | 12/2010 | Bafna et al. | 726/1 |
| 2012/0032789 A1* | 2/2012 | Ichimaru et al. | 340/10.5 |
| 2012/0036552 A1* | 2/2012 | Dare et al. | 726/1 |
| 2012/0297204 A1* | 11/2012 | Buer | 713/193 |
| 2013/0268997 A1* | 10/2013 | Clancy et al. | 726/1 |

* cited by examiner

*Primary Examiner* — Shewaye Gelagay
*Assistant Examiner* — Khoi Le
(74) *Attorney, Agent, or Firm* — Oblon, McClelland, Maier & Neustadt, L.L.P.

(57) ABSTRACT

Disclosed are various embodiments providing a portable wireless communication device that includes a secure element configured to route a set of input/output (I/O) channels to host processing circuitry of a mobile communication device. The secure element includes an application executable by the secure element, the application being configured to obtain a policy via an I/O channel of the set of I/O channels. The application is further configured to prevent the host processing circuitry from accessing data corresponding to at least a portion of the set of I/O channels according to the policy.

18 Claims, 4 Drawing Sheets

INPUT/OUTPUT GATEKEEPING

CROSS-REFERENCE TO RELATED APPLICATIONS

This application is a utility application that claims priority to co-pending U.S. Provisional patent application titled, "Input/Output Gatekeeping", having Ser. No. 61/720,584, filed Oct. 31, 2012, which is entirely incorporated herein by reference.

BACKGROUND

Mobile devices have multiple input/output (I/O) resources that provide a wide variety of functionality such as, for example, microphones, speakers, display, radio transceivers, cameras, etc. These I/O resources may be directly accessible to a host processor of a mobile device to employ a corresponding function. Thus, applications executed by the host processor have unrestricted access to these I/Os.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for establishing a secure setting for a wireless communication device operation. Wireless devices may employ a variety of functionality. For example, wireless devices may be equipped with a wireless radio, microphones and/or cameras, or may include one or more data ports.

There may be specific settings or environments that require security and/or privacy such that it is desirable to limit functionality associated with wireless devices. For example, entities operating court rooms, churches, movie theaters, libraries, conference rooms, or any other environment may wish to prevent users from accessing particular types of wireless device functionality such as a camera, a radio transceiver, a microphone etc. To this end, such entities may wish to establish a secure and/or private setting that limits the functionality of wireless devices.

Various embodiments of the present disclosure relates to a secure element implemented in a device, where the secure element functions as an input/output (I/O) gateway. To this end, the secure element of a device may be configured to enable or disable particular interfaces and/or I/O channels associated with the device. Furthermore, third-party entities may issue various policies for controlling the functionality of wireless devices in particular settings. These policies may be obtained and processed by the secure element of a wireless device.

Figure 1:
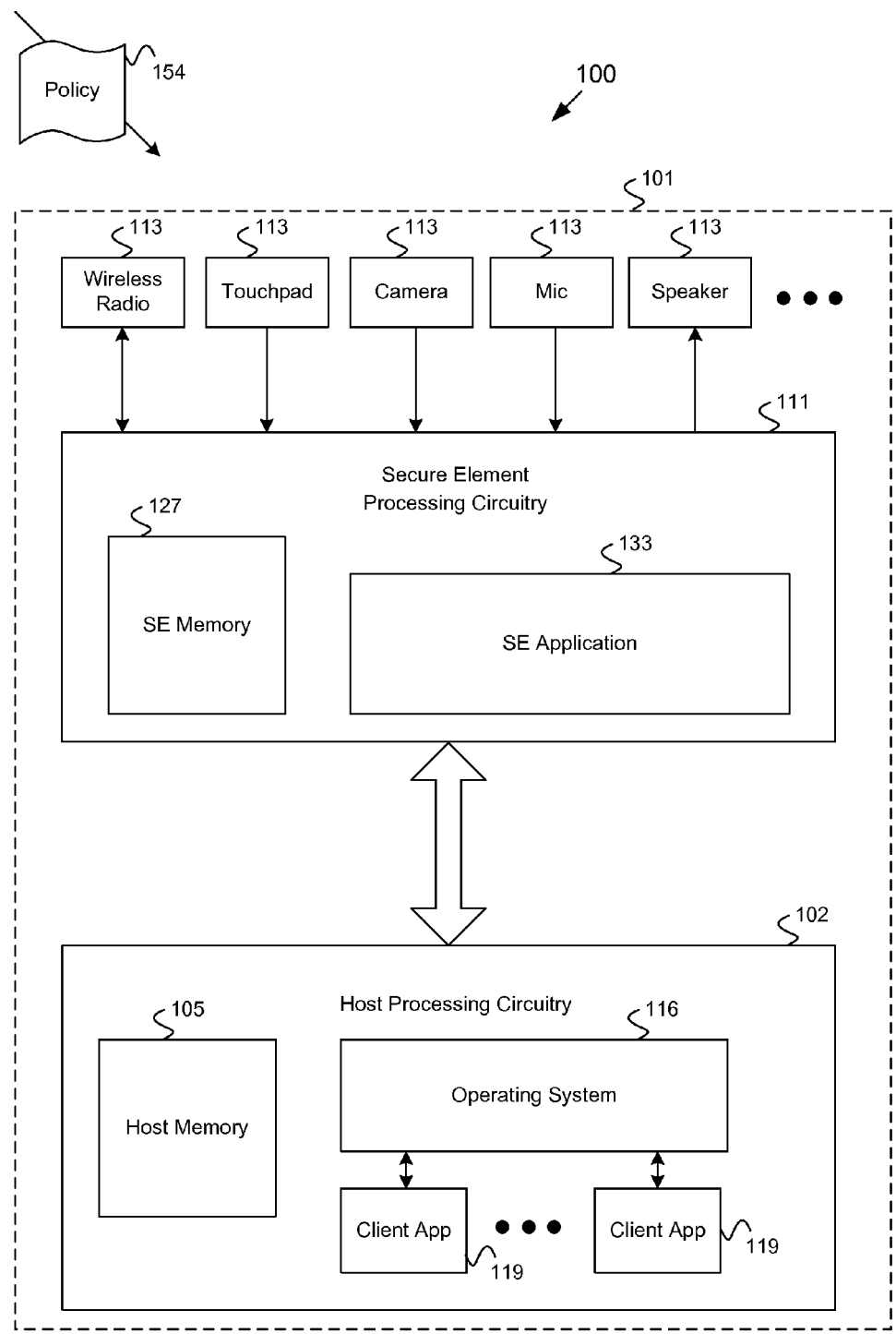
FIG. 1 is a drawing of an example of a wireless communication environment, in accordance with various embodiments of the present disclosure.

Reference is made to FIG. 1 which illustrates an example of a wireless communication environment 100, in accordance with various embodiments of the present disclosure. The wireless communication environment 100 includes a portable wireless communication device (PWCD) 101. The PWCD 101 may be any handheld or mobile device that facilitates wireless communication. For example, the PWCD may be a cellular phone, personal digital assistant, tablet, laptop, notebook, media player, or any other mobile computing device.

The PWCD 101 comprises host processing circuitry 102, a secure element (SE) processing circuitry 111, and one or more I/O's 113. In various embodiments, the host processing circuitry 102 is implemented as at least a portion of a microprocessor. The host processing circuitry 102 may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the host processing circuitry 102 may include one or more software modules executable within one or more processing circuits. The host processing circuitry 102 may further include host memory 105 configured to store instructions and/or code that causes the host processing circuitry 102 to execute various functions.

The host processing circuitry 102 comprises an operating system 116. An operating system 116 is executed by the host processing circuitry 102. The operating system 116 is software that manages resources of the PWCD 101. The operating system 116 may function as a platform for facilitating the execution of various applications such as, for example, client applications 119. Client applications 119 may be installed or otherwise loaded into the PWCD 101 for performing various functions for a user. To this end, client applications 119 may be stored in host memory 105 and executed by the host processing circuitry 102.

The PWCD 101 further comprises SE processing circuitry 111. In various embodiments, the SE processing circuitry 111 is implemented as a separate chip or separate piece of silicon with respect to the host processing circuitry 102. The SE processing circuitry 111 may be implemented as at least a portion of a microprocessor. The SE processing circuitry 111 may be implemented using one or more circuits, one or more microprocessors, application specific integrated circuits, dedicated hardware, digital signal processors, microcomputers, central processing units, field programmable gate arrays, programmable logic devices, state machines, or any combination thereof.

In yet other embodiments, the SE processing circuitry 111 may include one or more software modules executable within one or more processing circuits. The SE processing circuitry 111 may further include SE memory 127 configured to store instructions and/or code that causes the SE processing circuitry 111 to execute data communication functions. The SE processing circuitry comprises an SE application 133 that effectuates the functionality of the SE processing circuitry 111. The SE application 133 may be stored in the SE memory 127 and executed by the SE processing circuitry 111.

The SE processing circuitry 111 is communicatively coupled to the host processing circuitry 102 via an I/O bus or any other interface for facilitating data communication. To this end, the SE processing circuitry 111 and host processing circuitry 102 may communicate with one another by sending data according to a data transmission protocol. Furthermore, the I/O bus or interface that communicatively couples the SE processing circuitry 111 to the host processing circuitry 102 may comprise a secure interface according to a security protocol.

The PWCD 101 further comprises one or more I/O's 113. Each I/O provides an interface for facilitating various functions of the PWCD 101. An I/O 113, for example, may be a wireless radio, a touchpad, a keypad, and optical camera, a microphone, a speaker, a scanner, memory storage, a data or I/O port, or any other interface. A wireless radio I/O 113 may comprise a near field communication (NFC) receiver/transmitter, a Bluetooth radio, Wireless Local Area Network (WLAN) radio, a Long Term Evolution (LTE) radio, a High Speed Packet Access (HSPA) radio, any variants thereof, or any other wireless transmitter/receiver interface. An I/O data port may be, for example, a Universal Serial Bus (USB) port, Audio/Video (AV) port, Secure Digital (SD) port, any variants thereof, or any other data port.

Each I/O 113 may correspond to an I/O channel for communicating data to and from the PWCD 101. In this respect, an I/O 113 provides a resource for the PWCD 101. In various embodiments device drivers corresponding to each I/O 113 are stored in the SE memory 127. In other embodiments, the device drivers for each I/O 113 are stored in the host memory 105.

Furthermore, the non-limiting example of FIG. 1 depicts a wireless communication environment 100 that allows a PWCD 101 to receive a policy 154 according to various embodiments of the present disclosure. A policy 154 may be received via one of the I/O's 113.

Next, a general description of the operation of the various components of the wireless communication environment 100 is provided. The SE processing circuitry 111 provides a gateway that routes one or more I/O channels/resources to the host processing circuitry 102. To this end, the SE processing circuitry 111 isolates the host processing circuitry 102 from the various resources offered by the I/O's 113. That is to say, data transmitted via an I/O channel passes through the SE processing circuitry 111 as it is transmitted to the host processing circuitry 102 or transmitted out of the host processing circuitry 102.

Various client applications 119 executed in the host processing circuitry 102 may use one or more I/O's 113 of the PWCD 101. For example, a camera application 119 may be executed in a manner that demands the resources of a camera I/O 113. Accordingly, a camera I/O 113 may transmit data through an I/O channel to this camera application 119 via the secure element processing circuitry 111. As another non-limiting example, the host processing circuitry 102 that executes a phone application 119 may transmit data via the SE processing circuitry 111 to a wireless radio I/O 113. To this end, the SE processing circuitry 111 functions as a gateway between the host processing circuitry 102 and the various I/O resources of the PWCD 101.

In addition, the SE processing circuitry 111 facilitates a secure communication between the various I/O's 113 and the host processing circuitry 102. For example, the SE processing circuitry 111 may employ various protocols to facilitate encrypted communication between the I/O's 113 in the host processing circuitry 102. As a non-limiting example, client applications 119 executed in the host processing circuitry 102 are required to use digital signatures that are accepted by the SE processing circuitry 111 while the client applications 119 utilize the various I/O resources. If an audio recorder application 119 is configured to receive data through a microphone I/O channel, the recorder application 119 is required to submit a digital signature to the SE processing circuitry 111.

Untrusted client applications 119 that may have been unintentionally loaded in the PWCD 101. Untrusted client applications 119 may be prevented from using various I/O resources when such untrusted client applications 119 fail to comply with security protocols implemented by the SE processing circuitry 111. This leads to a blocking of untrusted client applications 119 by the SE processing circuitry 111. However, client applications 119 that do comply with the security protocols implemented by the SE processing circuitry 111 are deemed trusted such that the trusted client applications 119 may utilize the hardware resources offered by the various I/O's 113.

Various embodiments of the present disclosure are directed to implementing policies 154 that control the host processing circuitry's 102 access to one or more I/O's 113. Policies 154 may be generated and transmitted to the PWCD 101 by remote, third-party computing devices. These remote computing devices may be operated by various entities such as, for example, churches, movie theaters, libraries, conference rooms administrators, employers, courthouses, or any other environment that requires security and/or privacy. Such entities may administer I/O access policies 154 that are received by a PWCD 101. Policies 154 may be received via one or more I/O's 113 such as, for example, a wireless radio receiver, a near field communication receiver, a data port, or any other I/O 113 configured to receive data. Accordingly, a policy 154 may be encoded in a format that is compatible for communication via one of the I/O's 113.

The SE processing circuitry 111 may be configured to receive a policy 154 and implement the policy 154. A policy 154, for example, may specify a particular I/O 113 that is subject to regulation. As a non-limiting example, a policy 154 may relate to blocking access to the camera I/O channel of the PWCD 101. In this case, the policy instructs the PWCD 101 to prevent the host processing circuitry 102 from using camera resources.

Once a policy 154 is received, a policy 154 may be enforced by the SE processing circuitry 111. For example, the SE processing circuitry 111 may employ a Basic Input Output System (BIOS) level secure operating system executed within the SE processing circuitry 111. In this respect, the SE application 133 may comprise an operating system that is separately executed than the operating system 116 of the host processing circuitry 102.

In various embodiments, a policy 154 is encoded and/or encrypted in accordance with a security protocol implemented by the SE processing circuitry 111. For example, a policy 154 must be digitally signed using a signature that is accepted by the SE processing circuitry 111. Policies 154 may further specify a plurality of I/O's 113 that are subject to regulation.

In various embodiments of the present disclosure, the host processing circuitry 102 and the SE processing circuitry 111 are configured to be independently powered with respect to each other. Furthermore, the SE processing circuitry 111 may be configured to execute various applications such as, for example, the SE application 133 while the host processing circuitry 102 is inactive in a power saving state. That is to say, the host processing circuitry 102 may be placed in a sleep mode or any other low-power state mode while the SE processing circuitry 111 is active. Upon powering on the PWCD 101, the SE processing circuitry 111 may be configured to boot up before the host processing circuitry 102 boots up. In this respect, the SE processing circuitry 111 is initialized before the host processing circuitry 102 is initialized. The SE processing circuitry 111 may independently operate with respect to the host processing circuitry 102.

Figure 2:
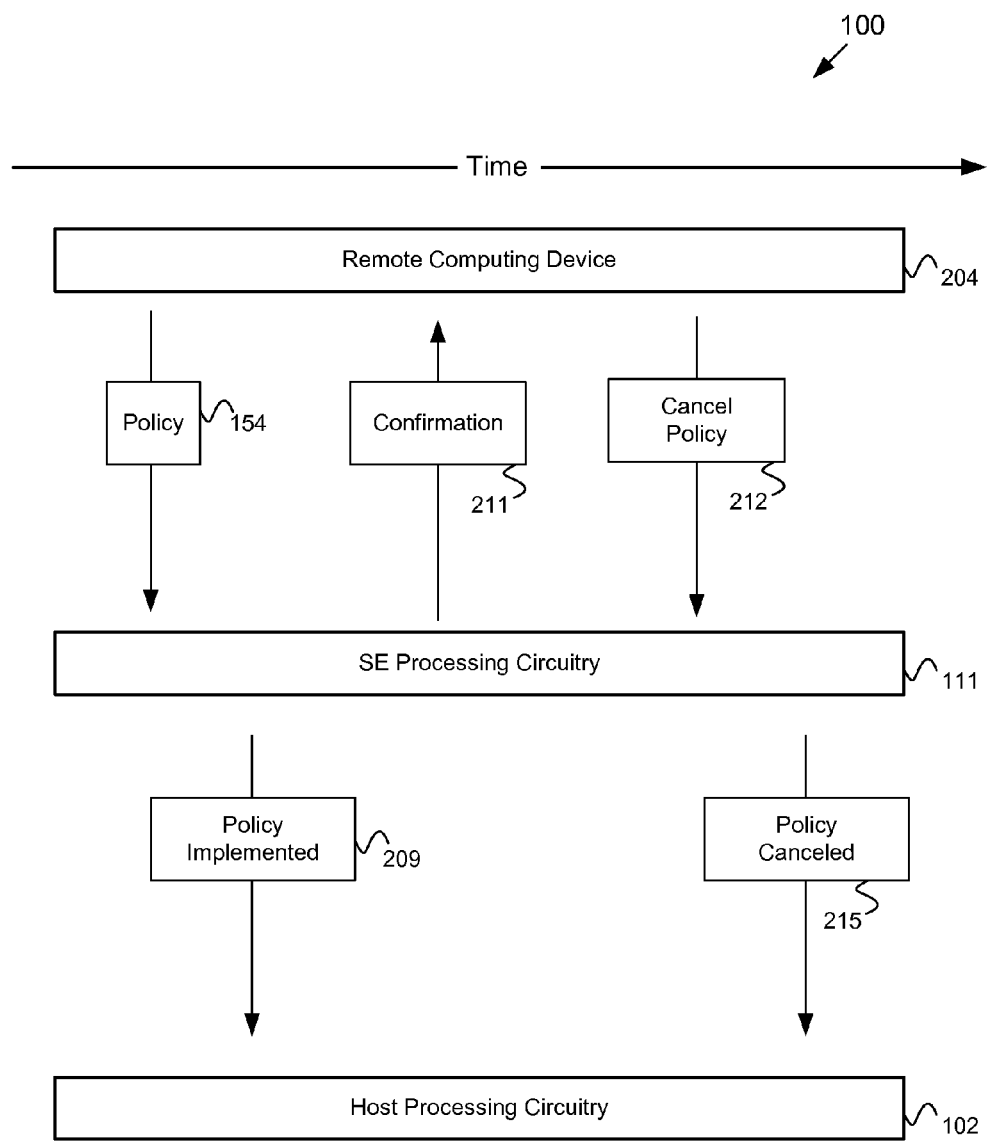
FIG. 2 is a diagram of an example of communication that may take place in the wireless communication environment of FIG. 1, in accordance with various embodiments.

Moving on to FIG. 2, shown is an example of communication in the wireless communication environment of FIG. 1, in accordance with various embodiments. The non-limiting example of FIG. 2 illustrates communication between a remote computing device 204 and a PWCD 101 (FIG. 1), where the PWCD 101 comprises SE processing circuitry 111 and host processing circuitry 102.

The remote computing device 204 may comprise processing circuitry. The processing circuitry of the remote computing device 204 may be implemented as at least a portion of a microprocessor, or may be implemented using one or more circuits, one or more microprocessors, application specific integrated circuits, dedicated hardware, digital signal processors, microcomputers, central processing units, field programmable gate arrays, programmable logic devices, state machines, or any combination thereof.

In yet other embodiments, the remote computing device 204 may include one or more software modules executable within one or more processing circuits. The remote computing device 204 may further include memory configured to store instructions and/or code that causes the remote computing device 204 to execute data communication functions. Accordingly, the remote computing device 204 may be configured to generate policies 154 and send the policies 154 to a PWCD 101.

In various embodiments, the remote computing device 204 obtains a digital signature, encryption key, or any other security key from a remote computing SE application. The remote computing SE application may be managed by the same administrator who manages the SE application 133 (FIG. 1) that is implemented in the PWCD 101. To this end, the administrator ultimately permits the remote computing device to generate policies 154 by providing the remote computing device 204 with a digital signature, encryption key, or any other security key.

The remote computing device 204 may encrypt/sign and then send the policy 154 to the PWCD 101 via an I/O channel. As a non-limiting example, the remote computing device 204 and the PWCD 101 may utilize NFC scanning to effectuate communication of the policy 154. As another non-limiting example, the PWCD 101 may receive the policy 154 as a data packet transmitted in accordance with a wireless transmission protocol via a wireless radio of the PWCD 101. This may be, for example, a Bluetooth radio, a WLAN radio, and LTE radio, any variants thereof, or any other wireless radio.

According to various embodiments, the remote computing device 204 is prevented from generating a trusted policy 154 unless the PWCD 101 is within a predefined geographic range. For example, the remote computing device 204 may obtain the geographic location of the PWCD using a Global Positioning System (GPS) or any other geographic location system provided by the PWCD 101. In various embodiments, the remote computing device 204 is prevented from digitally signing or encrypting the policy 154 if the geographic location of the PWCD exceeds the predefined geographic range. That is to say, the remote computing device 204 may be denied a digital signature, encryption key, or any other security key from an administrator who authorizes the use of policies 154. By employing geographic requirements for policy implementation, various embodiments of the present disclosure are directed to geographic-specific digital rights management.

As seen in the wireless communication environment 100 of FIG. 2, the PWCD 101 employs the SE processing circuitry 111 to receive the policy 154. In this respect, the SE processing circuitry 111 is configured to monitor various I/O channels for any incoming policies 154 that are transmitted by any number of remote computing devices 204. The SE processing circuitry 111 may employ an SE application 133 (FIG. 1) to handle incoming policies 154 independently of any other applications or processes executed by the host processing circuitry 102.

Once a policy 154 is received, the SE processing circuitry 111 is configured to implement or otherwise enforce the policy 154. By implementing a policy 154 the SE processing circuitry 111 may block I/O channels specified by the policy 154. By disabling specified I/O channels, various client applications 119 (FIG. 1) executed in the host processing circuitry 102 are prevented from accessing disabled I/O channels. That is to say, a client application 119 that attempts to use a blocked I/O channel will be denied access to data transmitted over the I/O channel. Thus, the SE processing circuitry 111 provides gatekeeping functionality between the various I/O resources and the applications executed in the host processing circuitry 102.

When a policy is implemented by the SE processing circuitry 111, the SE processing circuitry 111 may send an implementation notice 209 to the host processing circuitry 102 indicating that particular I/O channels or resources are disabled by a received policy 154. To this end, the implementation notice 209 notifies the PWCD 101 that the PWCD 101 is prevented from accessing one or more I/O channels. In various embodiments of the present disclosure, the host processing circuitry 102 may be configured to generate a user interface for display to a user. The user interface facilitates a visual display of a symbol or icon that indicates to the user that access to a particular I/O resource or channel is limited by a policy 154.

As seen in the non-limiting example of the wireless communication environment 100 of FIG. 2, the SE processing circuitry 111 may send a confirmation 211 to the remote computing device 204. The confirmation 211 may indicate that the policy 154 has been successfully enforced or otherwise implemented by the PWCD 101. Entities that are responsible for sending policies 154 may track whether such policies 154 are ultimately implemented by various PWCDs 101 in the wireless communication environment. In various embodiments, the remote computing device 211 may transmit an interference signal or any other jamming signal in response to a failure of receiving a confirmation 211 within a predetermined window of time. The interference signal or jamming signal may physically disrupt functionality of the PWCD 101.

The remote computing device 204 may also be configured to send it to the PWCD 101 a policy cancelation instruction 212. The policy cancelation instruction 212 may be configured to instruct the SE processing circuitry 111 to terminate an implementation of the policy 154. Upon receiving the policy cancelation instruction 212, the SE processing circuitry 111 may be unblock or otherwise enable those I/O channels that were previously blocked/disabled by the policy 154. Furthermore, the SE processing circuitry 111 may send a policy cancelation notification 215 to the host processing circuitry 102.

In response to receiving a policy cancelation notification 215, the host processing circuitry 102 may update the user interface that comprises the symbol or icon to reflect the fact that I/O access is permitted. Accordingly, client applications 119 executed in the host processing circuitry 102 may resume access to the I/O resources, thereby sending and/or receiving data over the various I/O channels.

Figure 3:
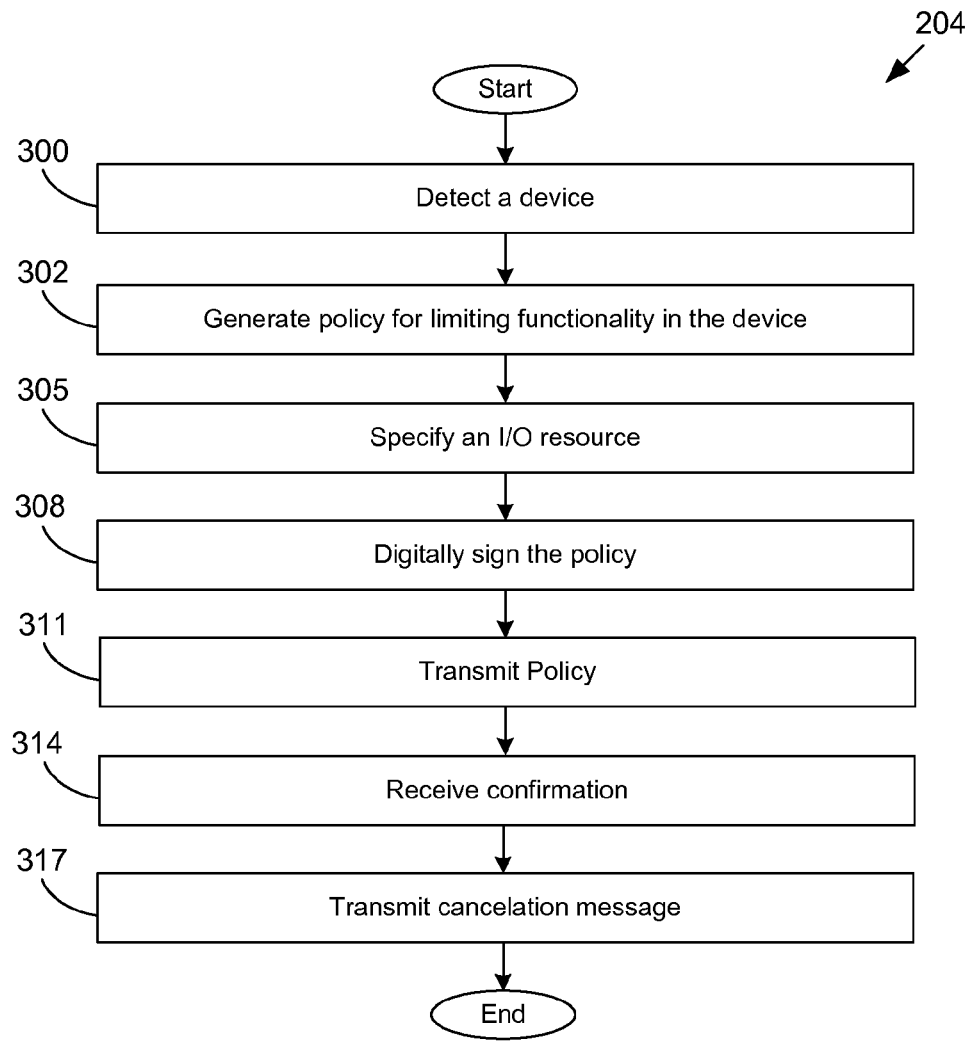
FIG. 3 is a flowchart illustrating examples of functionality implemented as portions of logic in the remote computing device of FIG. 2, in accordance with various embodiments of the present disclosure.

Turning to FIG. 3, shown is a flowchart illustrating examples of functionality implemented as portions of logic in the remote computing device 204 of FIG. 2 according to various embodiments of the present disclosure. It is understood that the flowchart of FIG. 3 provides merely an example of the many different types of functional arrangements that may be employed to implement the operation of the remote computing device 204 as described herein. As an alternative, the flowchart of FIG. 3 may be viewed as depicting an example of steps of a method implemented in the remote computing device 204 according to one or more embodiments. Specifically, the flowchart of FIG. 3 provides a non-limiting example of sending a policy 154 (FIG. 1) to one or more PWCDs 101 in a wireless communication environment 100 (FIG. 1)

To begin, the remote computing device 204 detects a PWCD 101. The presence of the PWCD 101 may be detected based on a wireless transmission signal generated by the PWCD 101 or by scanning the PWCD using an NFC system. In various embodiments, the remote computing device obtains a geographic location associated with the PWCD 101. For example, the PWCD may communicate its geographic location to the remote computing device 204.

At reference number 302, the remote computing device 204 generates a policy 154 for limiting the functionality in one or more PWCDs 101. For example, the remote computing device 204 may execute a remote computing SE application for generating the policy 154. The remote computing SE application may be configured to generate the policy 154 in accordance with a security protocol that is implemented by the SE processing circuitry 111 (FIG. 1) of a PWCD 101. For example, the remote computing SE application may provide a digital signature, encryption key, or any other security key to the remote computing device 204.

At reference number 305, the remote computing device 204 specifies an I/O resource or channel to be referenced by the policy 154. For example, the policy 154 may specify which I/O resources or channels are subject to regulation by the policy 154. For example, the policy 154 may disable, limit, or block a wireless radio, a camera, a display, a microphone, speaker, a data I/O port, or any combination thereof.

At reference number 308, the remote computing device 204 digitally signs the policy 154. The remote computing device 204 encodes/encrypts the policy 154 to ensure its compatibility with the SE processing circuitry 111 of the PWCD 101. The SE processing circuitry 111 may determine whether a policy 154 is to be trusted based on whether the policy is adequately signed. For example, the SE processing circuitry 111 may implement only those policies 154 that are signed according to a trusted digital signature.

In various embodiments, the remote computing device 204 requests the digital signature, encryption key, or security key from an administrator who is responsible for managing an SE application 133 (FIG. 1) implemented in the SE processing circuitry 111. The granting of this request may depend on the geographic location of the PWCD 101. For example, the remote computing device 204 may be prevented from digitally signing/encrypting the policy 154 if the PWCD is outside a predefined geographic range. In this respect, the administrator denies the request for a signature/key. Without a signature/key, the policy 154 is rendered untrusted and thus, not enforced by the PWCD 101.

At reference number 311, the remote computing device 204 transmits the policy 154. For example, the remote computing device 204 may employ an NFC scanner to facilitate a transmission of the policy 154 to the PWCD 101. In various embodiments of the present disclosure, the remote computing device 204 wirelessly transmits the policy 154 by broadcasting the policy to a plurality of PWCDs 101. In this respect, specific I/O resources corresponding to each PWCD 101 may be limited.

At reference number 314, the remote computing device 204 receives a confirmation from the PWCD 101 indicating whether the policy 154 has been implemented. At reference number 317, the remote computing device 204 transmits a policy cancelation instruction. The policy cancelation instruction causes a termination of the I/O policy in a PWCD 101.

As an alternative embodiment, the policy 154 specifies a duration of time that the policy 154 is valid. That is to say, the policy lapses after the duration of time expires. By using the policy 154 that automatically expires after a predetermined period of time, a policy cancellation instruction is not required to terminate or cancel enforcement of the policy 154 in a PWCD 101.

In yet other embodiments, the policy 154 specifies a geographic range for which the policy is enforceable. For example, the policy 154 comprises geographic parameters indicating locations where the policy 154 is active. If the PWCD 102 relocates to a geographic position that falls outside the geographic range of the policy 154, then the policy is inactive and thus, not enforced. Although the policy 154 is inactive, the policy may become active in response to the PWCD 102 relocating within the geographic range specified by the policy 154. To this end, the PWCD 101 may store policies 154 and activate such policies 154 depending on the location of the PWCD 101.

Figure 4:
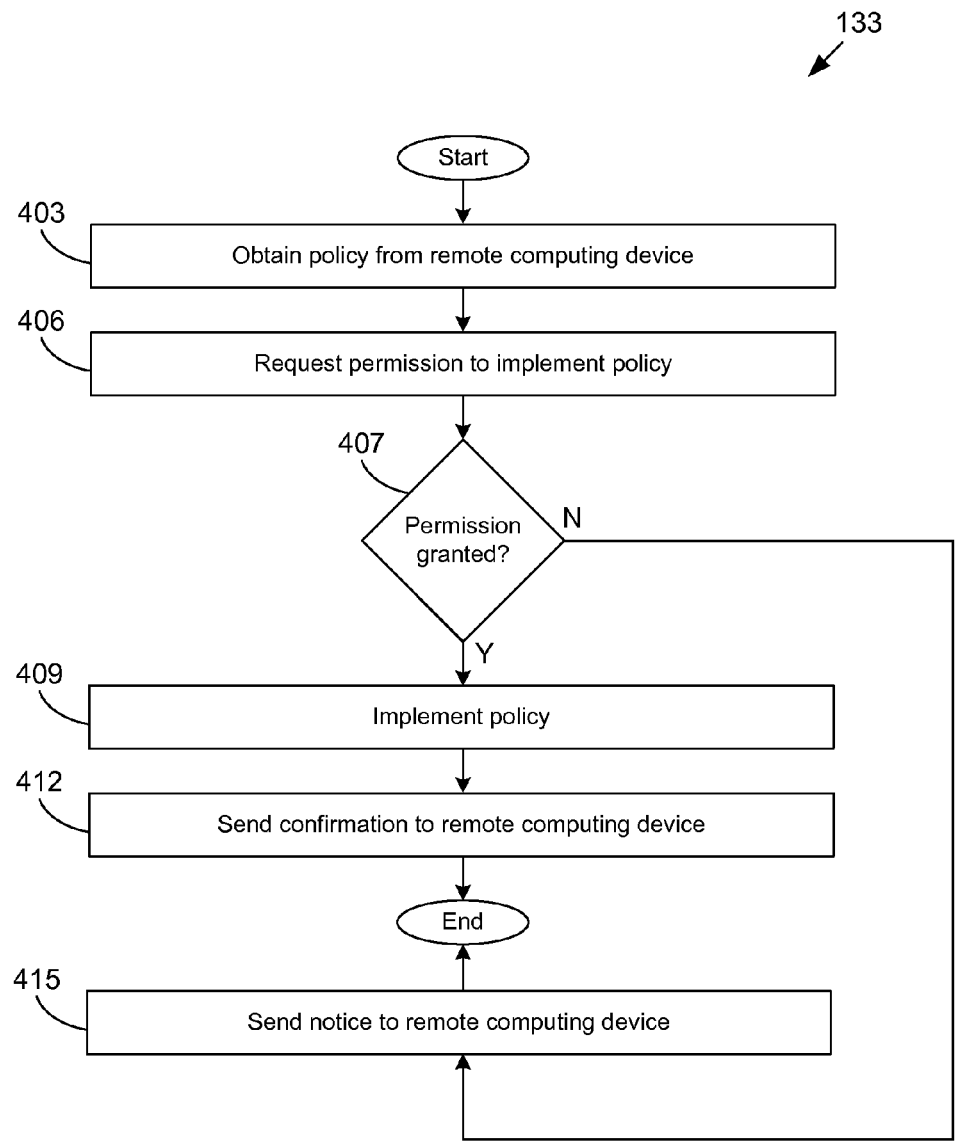
FIG. 4 is a flowchart illustrating examples of functionality implemented as portions of logic in the secure element application of FIG. 1, in accordance with various embodiments of the present disclosure.

Referring next to FIG. 4, is a flowchart illustrating examples of functionality implemented as portions of logic of the SE application 133 executed in SE processing circuitry 111 of FIG. 1 according to various embodiments of the present disclosure. It is understood that the flowchart of FIG. 4 provides merely an example of the many different types of functional arrangements that may be employed to implement the operation of SE application 133 as described herein. As an alternative, the flowchart of FIG. 4 may be viewed as depicting an example of steps of a method implemented in the SE application 133 according to one or more embodiments. Specifically, the flowchart of FIG. 4 provides a non-limiting example of obtaining and implementing an I/O access policy 154 (FIG. 1).

To begin, at reference number 403, the SE application 133 obtains a policy 154 from a remote computing device 204 (FIG. 1). The SE application 133 may receive the policy 154 via an I/O channel. As a non-limiting example, a PWCD 101 (FIG. 1) employing the SE application 133 may use an NFC scanning procedure for causing the SE application 133 to obtain the policy 154.

At reference number 406, the SE application 133 requests permission to implement the policy 154. For example, the SE application 133 may transmit a request to host processing circuitry 102 (FIG. 1) of the PWCD 101 to obtain permission to limit the host processing circuitry 102 from accessing various I/O resources/channels specified by the policy 154. The host processing circuitry 102 may execute one or more applications that render a user interface for a user for prompting the user to confirm an implementation of the policy 154. According to various embodiments, a user may decide whether to instruct the SE application 133 to continue implementing a policy 154.

At reference number 407 the SE application 133 waits for permission to implement the policy 154. If permission is granted, then the SE application 133 branches to reference number 409. In this case, the host processing circuitry 102 permits the SE application 133 to implement the policy 154. For example, this may be in response to a user allowing an implementation of the policy 154 in the PWCD 101. The user may grant permission via a user interface. Accordingly, the host processing circuitry 102 conveys the granting of permission to the SE processing circuitry 111 that executes the SE application 133.

At reference number 409, the SE application 133 implements the policy 154. By implementing the policy 154, the SE application 133 may block data transmission over I/O channels associated with various I/O resources. To this end, client applications 119 (FIG. 1) executed in the host processing circuitry 102 are prevented from using those I/O's specified by the policy 154. At reference number 412, the SE application 133 sends a confirmation to the remote computing device 204 indicating that the policy 154 has been implemented in the PWCD 101.

If permission is denied, as seen at reference number 407, then the SE application 133 branches to reference number 415. At reference number 415, the SE application 133 sends a notice to the remote computing device communicating 204 that the policy 154 is not implemented in the PWCD 101.

The flowcharts of FIGS. 3 and 4 show the functionality and operation of an implementation of portions of the remote computing device 204 and the SE application 133, respectively. If embodied in software, each item may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the remote computing device 204 and the SE application 133. The machine code may be converted from the source code, etc. If embodied in hardware, each item may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the items shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, the remote computing device 204 and the SE application 133, can be embodied in any non-transitory computer-readable medium for use by or in connection with an instruction execution system such as, for example, SE processing circuitry 111, host processing circuitry 102 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A mobile communication device comprising:
host processing circuitry to execute an operating system that manages resources of the mobile communication device and that establishes a platform for execution of applications; and
secure element processing circuitry configured to route a set of input/output (I/O) channels to the host processing circuitry to isolate the host processing circuitry from the I/O channels,
wherein the secure element processing circuitry is configured to execute an application to obtain a policy via an I/O channel of the set of I/O channels from a remote computing device and to prevent the host processing circuitry from accessing data corresponding to at least a portion of the set of I/O channels according to the policy, and
the application is configured to send a notification to the host processing circuitry in response to obtaining the policy, the notification indicating that the host processing circuitry is prevented from accessing at least the portion of the set of I/O channels,
wherein the secure element processing circuitry is configured to operate independently of the host processing circuitry, and is interposed between the host processing circuitry and the I/O channels.

2. The device of claim 1, wherein the portion of the set of I/O channels comprises at least one of a microphone channel, a speaker channel, a camera channel, a touch pad channel, a keypad channel, a wireless radio channel, a near field communication channel, or an I/O data port channel.

3. The device of claim 1, wherein the policy specifies a duration of time for preventing the host processing circuitry from accessing at least the portion of the set of I/O channels.

4. The device of claim 1, wherein the secure element processing circuitry is configured to execute the application while the host processing circuitry is inactive in a power saving state.

5. The device of claim 1, wherein the application is configured to prevent the host processing circuitry from accessing data based at least upon a geographic parameter specified by the policy and a geography location associated with the host processing circuitry.

6. A system comprising:
secure element processing circuitry configured to:
routeinput/output (I/O) resources to host processing circuitry of a mobile communication device to isolate the host processing circuitry from the I/O resources, the host processing circuitry to execute an operating system that manages resources of the mobile communication device and that establishes a platform for execution of applications on the mobile communication device;
obtain an I/O access policy via one of the I/O resources from a remote computing device;
limit the host processing circuitry from accessing at least a portion of the I/O resources according to the I/O access policy; and
send a notification to the host processing circuitry in response to obtaining the policy, the notification indicating that the host processing circuitry is prevented from accessing at least the portion of the I/O resources,
wherein the secure element processing circuitry is configured to operate independently of the host processing circuitry, and is interposed between the host processing circuitry and the I/O channels.

7. The system of claim 6, wherein at least the portion of the set of I/O resources comprises at least one of a microphone, a speaker, a camera, a touch pad, a keypad, a wireless radio, a near field communication receiver, or an I/O data port.

8. The system of claim 6, wherein the policy automatically expires according to a predetermined period of time.

9. The system of claim 6, wherein the host processing circuitry and the secure element processing circuitry are configured to be independently powered with respect to each other, wherein the host processing circuitry and the secure element processing circuitry are implemented within the mobile communication device.

10. The system of claim 6, wherein the host processing circuitry is configured to generate a user interface for display to a user, the user interface comprising a symbol indicating to the user that access to at least the portion of the I/O resources is limited by the I/O access policy.

11. The system of claim 6, wherein the secure element processing circuitry is configured to request permission from the host processing circuitry to limit the host processing circuitry from accessing at least the portion of the I/O resources in response to obtaining the I/O access policy.

12. The system of claim 6, wherein the secure element processing circuitry is configured to send a confirmation to the remote computing device in response to limiting the host processing circuitry from accessing at least the portion of the I/O resources.

13. The system of claim 6, wherein the secure element processing circuitry is configured to obtain a policy cancelation message from the remote computing device for terminating the I/O access policy.

14. A method for a processing circuit comprising:
generating an input/output (I/O) access policy for limiting functionality of a device;
specifying in the I/O access policy an I/O resource associated with the device, the device including secure element processing circuitry configured to execute the I/O access policy and isolate a host processing circuitry of the device from the I/O resource, the host processing circuitry executing an operating system that manages resources of the mobile communication device and that establishes a platform for execution of applications;
wirelessly transmitting the I/O access policy to the device; and
sending a notification to the host processing circuitry in response to the I/O access policy, the notification indicating that the host processing circuitry is prevented from accessing at least the portion of the I/O resource,
wherein the secure element processing circuitry is configured to operate independently of the host processing circuitry, and is interposed between the host processing circuitry and the I/O channels.

15. The method of claim 14, wherein wirelessly transmitting comprises broadcasting the I/O access policy to a plurality of devices for limiting functionality of the plurality of devices.

16. The method of claim 15, wherein the method further comprises digitally signing the I/O access policy for facilitating a trusted communication with the secure element processing circuitry.

17. The method of claim 16, wherein the method further comprises obtaining a geographic location associated with the device, wherein generating the I/O access policy comprises generating the I/O access policy based at least upon whether the geographic location is within a predefined geographic range.

18. The method of claim 16, wherein the method further comprises:
receiving a digital signature from an administrator in response to the device being within a predefined geographic range; and
digitally signing the I/O access policy using the digital signature.

* * * * *